US012734741B2

(12) United States Patent
Paslier et al.

(10) Patent No.: US 12,734,741 B2
(45) Date of Patent: Sep. 15, 2026

(54) EXTRUSION METHODS FOR MANUFACTURING SEAWEED-BASED FILMS AND PELLETS

(71) Applicant: NOTPLA LIMITED, London (GB)

(72) Inventors: Pierre-Yves Paslier, London (GB); Rodrigo Garcia Gonzalez, London (GB); Callum Wardle, London (GB); Andre Gaduan, London (GB); Erinc Bahcegul, London (GB); Oceane Gaudinet, London (GB); Daniel Pitt, London (GB); Louise Anderson, London (GB)

(73) Assignee: NOTPLA LIMITED, London (GB)

( * ) Notice: Subject to any disclaimer, the term of this patent is extended or adjusted under 35 U.S.C. 154(b) by 0 days.

(21) Appl. No.: 19/020,366

(22) Filed: Jan. 14, 2025

(65) Prior Publication Data

US 2025/0144864 A1 May 8, 2025

Related U.S. Application Data

(63) Continuation of application No. PCT/GB2023/051859, filed on Jul. 14, 2023.

(30) Foreign Application Priority Data

Jul. 14, 2022 (GB) ..................................... 2210325

(51) Int. Cl.
*B29C 48/00* (2019.01)
*B29B 9/06* (2006.01)
(Continued)

(52) U.S. Cl.
CPC .............. *B29C 48/022* (2019.02); *B29B 9/06* (2013.01); *B29C 48/05* (2019.02); *B29C 48/08* (2019.02);
(Continued)

(58) Field of Classification Search
CPC ....... B29C 48/022; B29C 48/05; B29C 48/08; B29B 9/06
See application file for complete search history.

(56) References Cited

U.S. PATENT DOCUMENTS

| | | | | |
|---|---|---|---|---|
| 6,730,340 | B1 | 5/2004 | Macquarrie et al. | |
| 6,902,783 | B1 * | 6/2005 | Hammer | B32B 27/18 426/138 |

(Continued)

FOREIGN PATENT DOCUMENTS

| | | |
|---|---|---|
| CN | 105330905 | 2/2016 |
| EP | 3954727 | 2/2022 |

(Continued)

OTHER PUBLICATIONS

Database WPI Week 201645 Thomson Scientific, London, GB; AN 2016-15438N XP 0028120293, & CN 105330905A (Zhou F), Feb. 17, 2016, 2 pages.

(Continued)

*Primary Examiner* — Seyed Masoud Malekzadeh
(74) *Attorney, Agent, or Firm* — Sheridan Ross P.C.

(57) ABSTRACT

The present invention relates to a method of manufacturing a pellet or film, wherein the pellet or film comprises at least 30 wt % seaweed material, wherein the seaweed material comprises seaweed material derived from macro algae, and wherein the at least one plasticiser comprises water or at least one C—H bond.

19 Claims, 5 Drawing Sheets

(51) Int. Cl.

| | |
|---|---|
| ***B29C 48/05*** | (2019.01) |
| ***B29C 48/08*** | (2019.01) |
| ***B29K 1/00*** | (2006.01) |
| ***B29K 105/00*** | (2006.01) |

(52) U.S. Cl.
CPC ...... *B29K 2001/00* (2013.01); *B29K 2005/00* (2013.01); *B29K 2105/0038* (2013.01); *B29K 2995/0097* (2013.01)

(56) References Cited

U.S. PATENT DOCUMENTS

| | | | | |
|---|---|---|---|---|
| 12,049,729 | B2 * | 7/2024 | Catarino | A01G 33/00 |
| 12,286,524 | B2 * | 4/2025 | Marsh | C08K 5/053 |
| 2010/0272940 | A1 * | 10/2010 | Shi | C08L 3/02 264/328.17 |
| 2018/0258231 | A1 | 9/2018 | Lavoisier et al. | |
| 2024/0183108 | A1 * | 6/2024 | Catarino | A01G 33/00 |

FOREIGN PATENT DOCUMENTS

| | | |
|---|---|---|
| FR | 3012817 | 5/2015 |
| FR | 3041351 | 3/2017 |
| KR | 10-2016-0147394 | 12/2016 |
| WO | WO 2023/081848 | 5/2023 |
| WO | WO 2023083253 | 5/2023 |
| WO | WO 2023/131974 | 7/2023 |

OTHER PUBLICATIONS

Chiellini et al. "Biodegradable Thermoplastic Composites Based on Polyvinyl Alcohol and Algae," Biomacromolecules, 2008, vol. 9, pp. 1007-1013.

Official Action for United Kingdom Patent Application No. GB2210325.3, dated Jan. 30, 2023, 6 pages.

International Search Report and Written Opinion for International (PCT) Patent Application No. PCT/GB2023/051859, dated Oct. 27, 2023, 12 pages.

* cited by examiner

EXTRUSION METHODS FOR MANUFACTURING SEAWEED-BASED FILMS AND PELLETS

CROSS REFERENCE TO RELATED APPLICATIONS

This application claims the benefit of priority under 35 U.S.C. § 120 and is a continuation of International PCT Application No. PCT/GB2023/051859, filed 14 Jul. 2023, which claims the benefit of priority from Great Britain Patent Application No. 2210325.3 filed 14 Jul. 2022, the disclosures of each of which are incorporated herein by reference in their entireties.

FIELD OF INVENTION

The present invention relates to a biodegradable product, and methods of producing the same. In particular, the present invention relates to a novel process for manufacturing a pellet or film comprising seaweed materials for a packaging product such as a tray, or film; and/or a disposable product.

BACKGROUND OF THE INVENTION

Single-use plastics (SUPs) are being increasingly used and produced globally, forming an integral part of our daily lives, yet they are responsible for about 150 million tonnes of plastic waste each year worldwide. SUPs are intended to be used once before being thrown away and becoming non-biodegradable waste. Even though a considerable proportion of plastics are recyclable, only an approximate 9% of all plastic is recycled (NRDC, 2020). SUPs are primarily produced from fossil-fuel based chemicals, most commonly for use as packaging, bottles, wrappers, straws, and bags. Of the 91% of unrecycled plastics, over half ends up in landfill waste causing significant damages to the environment, especially to marine ecosystems (National Geographic, 2018).

There exists a major problem associated with the difficulty in recycling specific plastics such as thin plastic film and bags used as packaging for consumer products. Considering the continuous increase of plastic waste production, recycling of plastic alone is not a sufficient solution. It is therefore imperative to decrease the usage of fossil fuel-based plastic packaging by developing sustainable bio-based alternatives.

In recent years, the wide applications of seaweed materials have become increasingly explored. However, due to certain properties of seaweed, there have been difficulties in working with seaweed and developing manufacturing methods suitable for it to make stable products for uses such as packaging consumer products. Difficulties in working with seaweed includes access to material (cultivating & harvesting seaweed is not widespread as it is expensive and time consuming, unless the seaweed is used for a pharma or food product whereby only the extracts are used and the rest of the biomass is generally discarded or used as fertiliser). Additionally, processing costs are high, as seaweed needs to be dry and free of sand and salt to be processed in standard extrusion or moulding equipment. As seaweed is mostly water, drying methods can be non-economical but better technologies have recently been developed.

The present invention seeks to solve this problem.

SUMMARY OF THE INVENTION

The present invention concerns the production of bioplastics from the renewable source of seaweed materials in order to address the major problems associated with plastic waste pollution. Specifically, the present invention relates to a bioplastic material in the form of a pellet or film, and the preparation thereof from seaweed material for the manufacture of a solid product, such as a packaging product. The inventors have surprisingly found a method for manufacturing a solid product in which the composition comprises at least 30 wt % seaweed material, while retaining the essential characteristics of bioplastics and biodegradation as well as long-term stability. Due to seaweed's high production rate and ability to cultivate in marginal lands, seaweed materials pose a particularly attractive source for bioplastic production. The intrinsic qualities of seaweed materials provide a renewable source for producing bioplastics that possess the ability to biodegrade much quicker, while retaining characteristics of traditional plastics. Thus, the use of seaweed-based bioplastics creates an excellent alternative to SUPs and non-biodegradable or non-recyclable plastics.

The pellet and film of the present invention may be up to 100% home-compostable. The method of the present invention is environmentally-friendly and cost-effective as a high weight percentage of the obtained material (at least half) is the whole seaweed, or waste seaweed remaining after the extraction of valuable macromolecules, or even waste seaweed fibers. Furthermore, the method is quick resulting in high through-put.

Further, the method of the present invention is more environmentally friendly compared to other processes such as solvent or aqueous-based casting methods, due to lower energy consumption.

Accordingly, a first aspect of the present invention provides a method of manufacturing a pellet or film, the method comprising the steps of:

(i) feeding seaweed material and at least one plasticiser into an extruder, wherein the seaweed material comprises seaweed material derived from macro algae;

(ii) extruding the seaweed material and the at least one plasticiser through a die to obtain a filament or the film, wherein the filament or the film comprises at least 30 wt % seaweed material; and (iii) pelletising the filament to obtain the pellet;

wherein the at least one plasticiser comprises water or at least one C—H bond.

A second aspect of the invention is a pellet, film or solid product obtainable by the method of the first aspect of the invention.

A third aspect of the invention is a pellet or film comprising at least one plasticiser, and at least 30 wt % seaweed material, wherein the seaweed material comprises seaweed material derived from macro algae, and wherein the at least one plasticiser comprises water or at least one C—H bond.

A fourth aspect of the invention is a solid product comprising at least one plasticiser, and at least 30 wt % seaweed material, wherein the seaweed material comprises seaweed material derived from macro algae, and wherein the at least one plasticiser comprises water or at least one C—H bond.

DETAILED DESCRIPTION OF THE INVENTION

Figure 1:
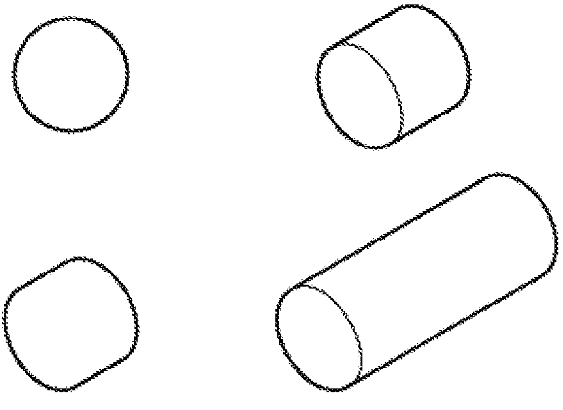
FIG. 1. Seaweed pellets created by filament extrusion and compounding.
Figure 2:
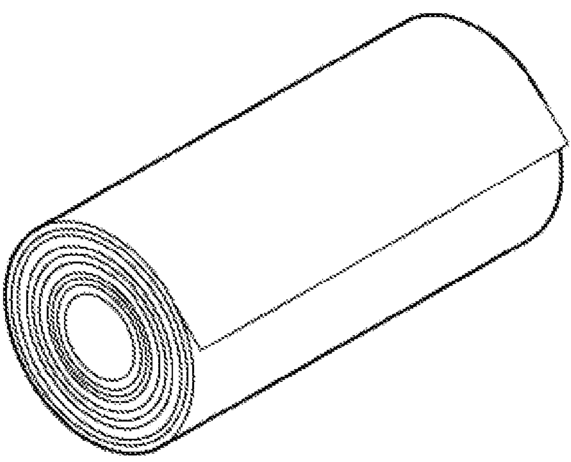
FIG. 2. Seaweed film created by film extrusion.
Figure 3:
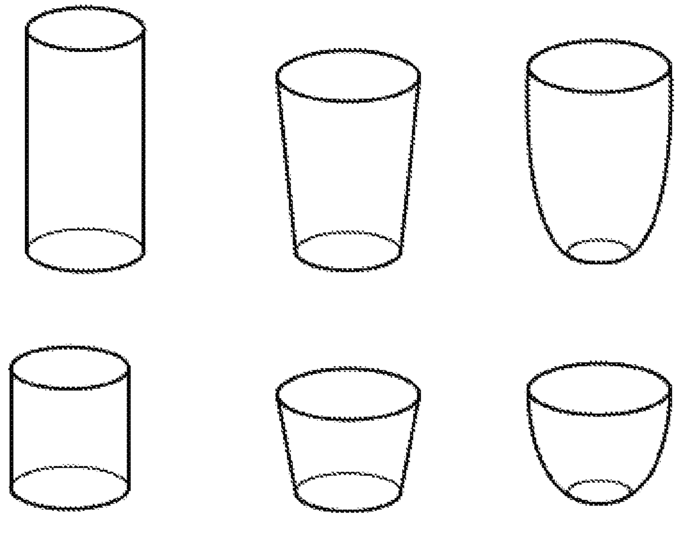
FIG. 3. Seaweed container/cup produced by injection moulding using seaweed pellets FIG. 4. Seaweed containers, bowls, plates produced by injection moulding using seaweed pellets.
Figure 4:
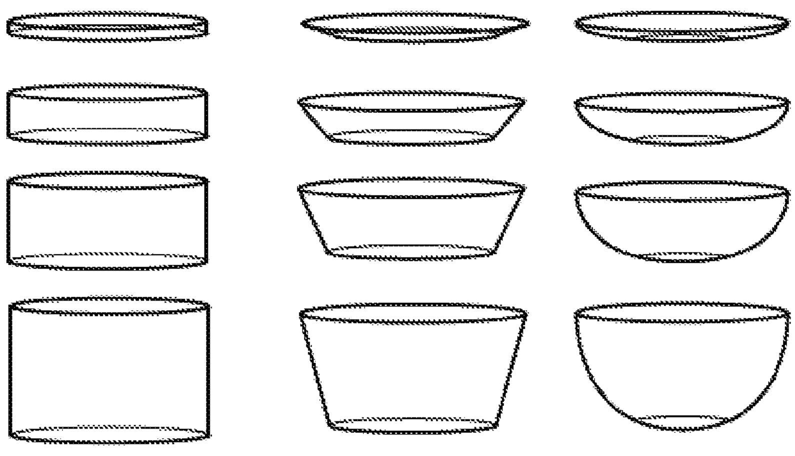
Figure 5:
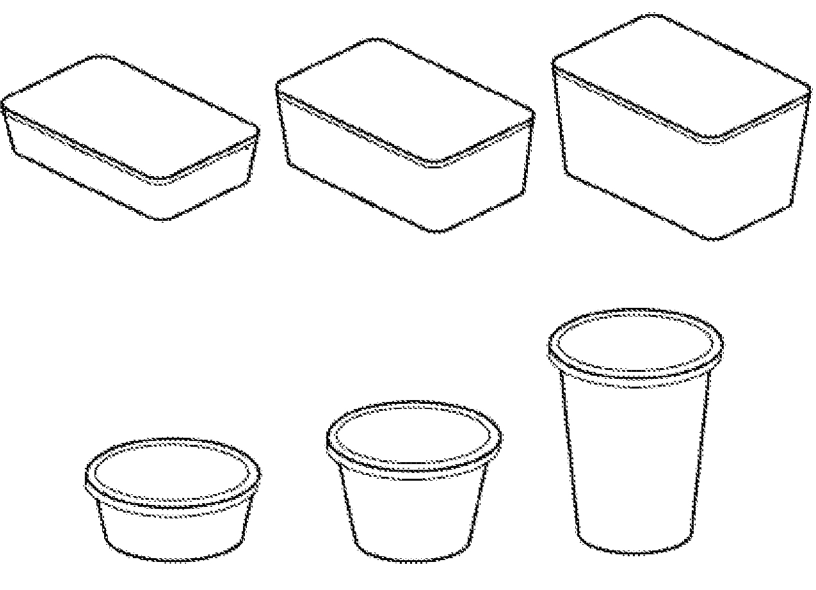
FIG. 5. Seaweed containers, bowls, with lids produced by injection moulding using seaweed pellets.
Figure 6:
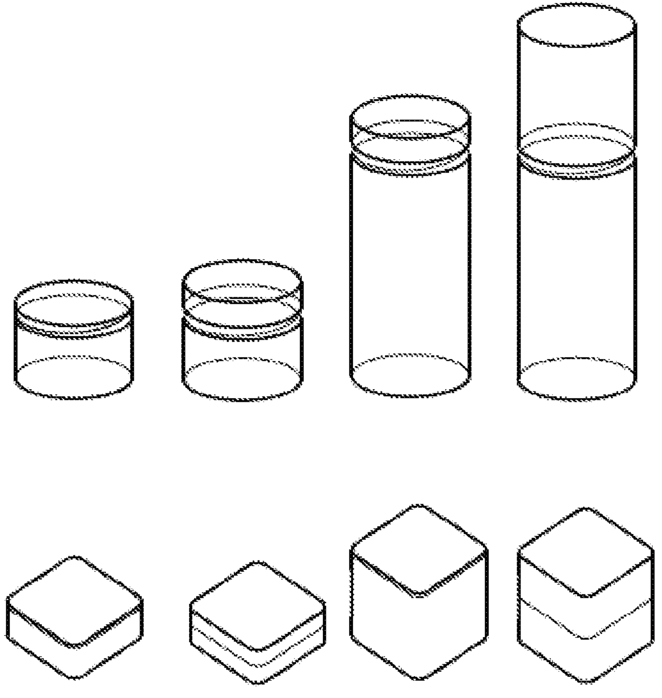
FIG. 6. Seaweed containers, jars with lids produced by injection moulding using seaweed pellets.
Figure 7:
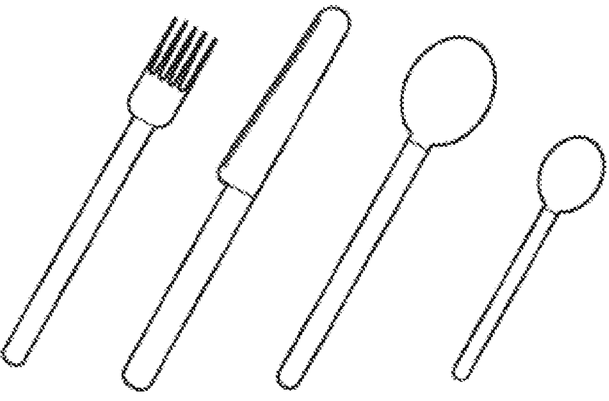
FIG. 7. Seaweed cutlery produced by injection moulding using seaweed pellets.
Figure 8:
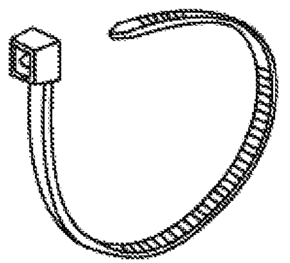
FIG. 8. Seaweed cable tie produced using seaweed pellets.
Figure 9:
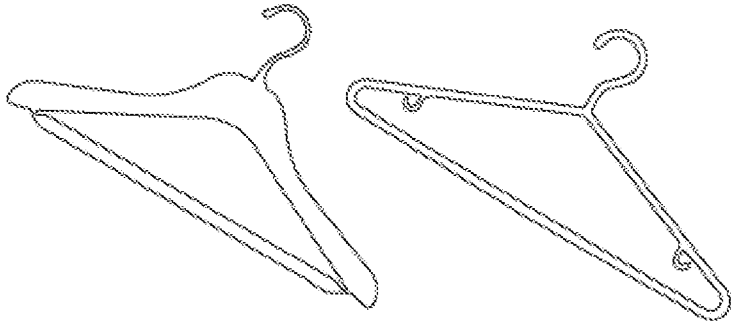
FIG. 9. Seaweed clothes hangers produced using seaweed pellets.
Figure 10:
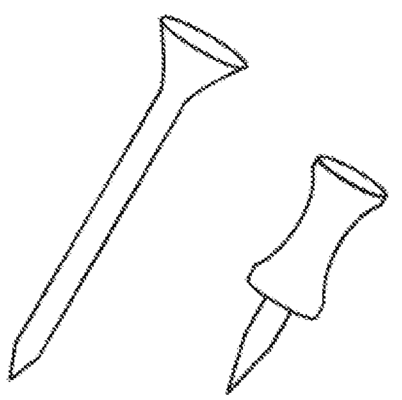
FIG. 10. Seaweed golf tees produced using seaweed pellets.

Unless indicated otherwise, all technical and scientific terms used herein will have their common meaning as understood by one of ordinary skills in the art to which this invention pertains.

The term "comprising", or variants thereof will be understood to imply the inclusion of a stated element, integer or step, or group of elements, integers or steps, but not the exclusion of any other element, integer or step, or group of elements, integers or steps. As used herein, the term "comprising" includes "consisting of".

The term "consisting of" or variants thereof is to be understood to imply the inclusion of a stated element, integer or step, or group of elements, integers or steps, and the exclusion of any other element, integer or step or group of elements, integers or steps.

The term "wt %" is a commonly used abbreviation in the art and refers to the "weight %" with respect to the total weight of the material referred to. For the avoidance of doubt, where appropriate, if drying of the filament or film is necessary, the weight percentage is with respect to the weight of the filament (and subsequently formed pellet) or film after drying.

As used herein, "seaweed material" refers to material derived from marine algae and includes the whole seaweed plant, waste seaweed from the extraction of macromolecules (agar, carrageenan, alginate, or of any other natural polysaccharide materials), macromolecules naturally present in seaweed (such as agar, carrageenan, alginate), and seaweed fibres (including waste seaweed fibers).

Suitably, according to the first aspect of the invention, there is provided a method of manufacturing a pellet or film, the method comprising the steps of:

(i) feeding seaweed material and at least one plasticiser into an extruder, wherein the seaweed material comprises seaweed material derived from macro algae;

(ii) extruding the seaweed and the at least one plasticiser through a die to obtain a filament or the film, wherein the filament or the film comprises at least 30 wt % seaweed material; and (iii) pelletising the filament to obtain the pellet, wherein the at least one plasticiser comprises water or at least one C—H bond.

The term "filament" (also known as "extrudate") refers to the material that has been extruded through the die. Film is a particular form of extrudate whereby the material is in the form of a thin flexible sheet.

Suitably, the seaweed material comprises the whole seaweed plant and/or the seaweed material comprises waste seaweed.

As used herein, "waste seaweed" refers to seaweed material resulting from industrial extraction processes, such as extraction of macromolecules (agar, carrageenan, alginate, or other natural polysaccharides). "Waste seaweed" also refers to industrially rejected seaweed (i.e. seaweed that was harvested from seaweed farming and was rejected for use in the primary purpose for which it was grown). "Waste seaweed" includes seaweed material which would have otherwise been disposed of, such as in a landfill, or composted.

In an embodiment, the seaweed material comprises seaweed material derived from a refined or semi-refined seaweed extract.

In an embodiment, the seaweed material comprises one or a mixture of two or more of agar, carrageenan and alginate. Carrageenan includes forms such as kappa-carrageenan, lambda-carrageenan and Iota carrageenan.

In an embodiment, the seaweed material comprises seaweed fibers. In a particular embodiment, the seaweed material comprises waste seaweed fibers.

Suitably, the seaweed material comprises seaweed material derived from red seaweed. In some embodiments, the red seaweed may be Eucheuma sp., Furcellaria sp., Gelidiella sp., *Gracilaria* sp., Gigartina sp., Gelidium sp., Gymnogongrus sp., Hypnea sp., Kappaphycus sp., Lemanea sp., Mastocarpus sp., *Palmaria* sp., *Porphyra* sp., *Schmitzia* sp., *Chondrus* sp., Mastocarpus sp., Acrochaetium sp., Audouinella sp., *Polysiphonia* sp., *Solieria* sp., *Vertebrata* sp., Pterocladia sp., Acanthopeltis sp., Asparagopsis sp.

Preferably, the seaweed material comprises seaweed material derived from *Gracilaria* sp, Gelidium sp or Euchema sp.

Suitably, the seaweed material comprises seaweed material derived from green seaweed. In some embodiments, the green seaweed may be Blidingia sp., *Bryopsis* sp., Chaetomorpha sp., *Cladophora* sp., *Cladophora* sp., *Codium* sp., Derbesia sp., Lychaete sp., *Ulva* sp., *Urospora* sp., and *Prasiola* sp.

Suitably, the seaweed material comprises seaweed material derived from brown seaweed. In some embodiments, the brown seaweed may be Sargassum sp., Ascophyllum sp., Kelp sp, *Saccharina* sp., *Laminaria* sp., Rugelopteryx sp., *Ecklonia* sp., Durvillea sp., *Macrocystis* sp., *Lessonia* sp.

The seaweed material comprises seaweed material derived from macro algae. Macroalgae (seaweed) are multicellular, large-size and visible with the naked eye. In some embodiments, the macro algae may be Rhodophyta sp., Phaeophyta sp. and Chlorophyta sp.

In some embodiments, the seaweed material comprises at least 10 wt % seaweed material derived from macro algae, such as at least 20 wt %, 30 wt %, 40 wt %, 50 wt %, 60 wt %, 70 wt %, 80 wt %, or 90 wt %.

In particular embodiments, the macro algae is derived from the group consisting of Kappaphycus sp., Eucheuma sp, Halymenia sp., *Chondrus* sp., *Porphyra* sp., Hypnea sp., *Solieria* sp., Mastocarpus sp., *Gracilaria* sp., Gigartina sp. Gelidium sp., Furcellaria sp., Sargassum sp., Ascophyllum sp., Kelp sp., *Saccharina* sp., *Laminaria* sp., Asparagopsis sp., *Ulva* sp., kappa-carrageenan, iota carrageenan, lambda-carrageenan, alginate, agar, furcellaran, and mixtures of two or more thereof.

In preferred embodiments, the macro algae comprises macro algae derived from *Gracilaria* and/or Gelidium.

In some embodiments, the seaweed material comprises seaweed material derived from a semi-refined or unrefined food grade seaweed powder, such as *Gracilaria* or Gelidium or Euchema seaweed powder, red *Gracilaria* or Gelidium or Euchema seaweed powder, whole *Gracilaria* or Gelidium or Euchema seaweed powder.

In some embodiments, the seaweed material may further comprise seaweed material derived from micro algae. Micro algae are microscopic single cells and may be prokaryotic (Chloroxybacteria), or eukaryotic, similar to green algae (Chlorophyta). Micro algae can possess high contents of different carbohydrates, such as glycogen, starch, agar and cellulose as well as differing protein and lipid contents. Proteins and lipids may be useful components for the formulation owing to improvements to properties such as strength and barrier performance.

In some embodiments, the micro algae may be *Spirulina platensis, Chlorella* sp., *Scenedesmus* sp., Dunaliella sp., *Synechococcus* sp., *Euglena* sp., Prymnesium sp., *Anabaena* sp., *Chlamydomonas* sp., Porphyridium sp., *Spirulina maxima*, Spirogyra, Tetraselmis, *Pavlova, Enteromorpha intestinalis, Rhizoclonium riparium, Lola capillaris, Ulva lactuca, Catenella reps, Polysiphonia mollis*. The micro algae may also be engineered to produce typical seaweed hydrocolloids such as agar, alginate, carrageenan or ulvan.

In some embodiments, the seaweed material comprises at least 1 wt % seaweed material derived from micro algae, such as at least 2 wt %, 3 wt %, 4 wt %, 5 wt %, 6 wt %, 7 wt %, 8 wt %, 9 wt %, 10 wt %, 11 wt %, 12 wt %, 13 wt %, 14 wt % or 15 wt %. In some embodiments, the seaweed material comprises less than 50 wt % seaweed material derived from micro algae, such as less than 40 wt %, 30 wt %, 20 wt %, or 10 wt %. Any of the aforementioned lower or upper limits of the ranges may be combined with each other as appropriate, and are herein disclosed.

In some embodiments, the micro algae comprises a micro algae species that has a high carbohydrate or polysaccharide content, such as Scenedesmu sp., Porphyridium sp., Spirogyra, Enteromorpha *intestinalis, Ulva lactuca, Catenella* repns etc.

In some embodiments, the micro algae comprises a micro algae species that has a high protein content, such as *Spirulina platensis, Synechococcus* sp., *euglena* sp., *Spirulina maxima* etc.

In some embodiments, the micro algae comprises a micro algae species that has a high lipid fraction, such as *Chlorella* sp., *Euglena* sp., Prymnesium sp., *Chlamydomonas* sp., Spirogyra, Tetraselmis, *Pavlova* etc. High lipid micro algae may be added to improve barrier properties.

In some embodiments, the seaweed material comprises a polysaccharide derived from seaweed. In more particular embodiments, the seaweed polysaccharide is selected from the group consisting of starch, amylose, amylopectin, alginate, agar, carrageenan, laminarin, fucoidan, and ulvan, preferably starch, alginate, carrageenan, more preferably the polysaccharide is starch or agar.

The presence of a macromolecule, such as polysaccharide, in the film or pellet may increase the structural integrity of the film or pellet, such as by forming a polymeric matrix throughout the material. Such macromolecules may also improve the consistency and durability of the material.

Plant-based polysaccharides may also be used in the invention to increase the structural integrity or improve the processability of the film or pellet. As such, in some embodiments, step (i) of the method of the first aspect of the invention further comprises feeding a plant-based polysaccharide into the extruder and extruding it with the seaweed material and at least one plasticiser in step (ii). In more particular embodiments, the plant-based polysaccharide is selected from the group consisting of starch, cellulose, glycogen, carboxymethylcellulose (CMC), xanthan gum, konjac, xyloglucans, heteroxylans, mannans, and pectin polysaccharides. Suitably the film, filament and/or pellet may comprise less than 10 wt % of a plant-based polysaccharide, preferably less than 8 wt %, more preferably less than 6 wt %, even more preferably less than 4 wt %, such as less than 2 wt % or less than 1 wt %. In one embodiment there is substantially no plant-based polysaccharide. Preferably the seaweed material comprises less than 1 wt % cellulose, such as no cellulose.

In some embodiments, the film, filament and/or pellet may comprise starch, such as more than 0.1 wt % starch, such as more than 1 wt %, 2 wt %, 3 wt %, 4 wt %, 5 wt %, 10 wt %, 15 wt %, 20 wt %, or 25 wt %. Suitably the film, filament and/or pellet comprises less than 35 wt %, such as less than 30 wt % of starch, for example less than 25 wt % of starch. Such starch may be derived from seaweed or plants, or a combination thereof.

Suitably, the weight ratio of seaweed polysaccharide to plant-based polysaccharide in the film, filament and/or pellet is at least 1:1, such as 2:1, 3:1, 4:1, 5:1, 6:1, 7:1, 8:1 or 9:1. In this instance, “at least” means that the amount of seaweed polysaccharide may be present in an amount greater than the mentioned ratio, e.g., “at least 1:1 or 2:1” includes ratios wherein the first integer is greater than 1 or 2 respectively, such as 2.5:1, 3:1.

In some embodiments, the filament or the film, or the pellet comprises at least 5 wt %, preferably at least 10 wt % polysaccharide, such as at least 15 wt %, 20 wt %, 25 wt %, 30 wt %, 35 wt % or 40 wt %.

The seaweed material and plasticiser are fed into an extruder. They may be fed into the extruder in any form, for example, they may be added to the extruder separately, e.g., a first composition comprising the seaweed material and a second composition comprising the at least one plasticiser are fed into the extruder separately. Alternatively, a composition comprising seaweed material and the at least one plasticiser are fed into the extruder, i.e., they may be mixed together outside of the extruder and then fed into the extruder as a single mixed composition.

Suitably, the seaweed and the plasticiser are extruded through a die to obtain a filament or the film, wherein the filament or the film comprises at least 30 wt % seaweed material.

Suitably, the filament, the pellet and/or the film comprises at least 30 wt % seaweed material, such as at least 35 wt %, 40 wt %, 45 wt %, 50 wt %, 55 wt %, 60 wt %, 65 wt %, 70 wt %, 75 wt %, 80 wt %, 85 wt %, or 90 wt %.

Seaweed material that is milled to small particles helps improve the mixing in the extruder and thus the homogeneity of the resulting extruded material. Milling down improves processability and surface area to volume ratio for heating and the subsequent melting/shear processes (e.g. to help the material flow). In addition, if there are any insoluble components in the seaweed, they must be small enough so as to not disrupt the mechanical integrity of the final product.

Suitably the seaweed material is in powder form when fed into the extruder in step (i).

In some embodiments, the method of the first aspect of the invention further comprises the pre-step of milling down the seaweed material to particle larger than 0.1 μm, such as larger than 1 μm, 10 μm, 20 μm, 30 μm, 40 μm, 50 μm, 75 μm, 100 μm, 125 μm, 150 μm, 175 μm, 200 μm, 500 μm, 750 μm, 1 mm, 1.5 mm, or 2 mm.

In some embodiments, the method of the first aspect of the invention further comprises the pre-step of milling down the seaweed biomass material to particle smaller than 5 mm, such as smaller than 4 mm or 3 mm, preferably smaller than 2 mm.

For the avoidance of doubt, any of the aforementioned lower range end-points may be combined with any of the aforementioned upper range end-points.

A "plasticiser" is a substance that promotes plasticity and flexibility to reduce rigidity of the product and improves workability and processability of the mixture in the extruder.

Plasticisers are generally high boiling point liquids with low molecular weights. The low molecular weight of the plasticiser enables it to occupy intermolecular spaces between polymer chains, reducing secondary forces among them, which reduces the energy required for motion within the molecule and also reduces the hydrogen bonding between the chains. As a result, this increases the free volume of the polymer material and improves the flowability of the polymer, making it easier to use in an extrusion or injection moulding process.

The degree of plasticity in a polymer is largely dependent on the chemical structural groups. The type and concentration of plasticiser used can greatly affect the resulting processing characteristics, thermal and mechanical properties of the material and the end product. Plasticisers are essential substances for extrusion processing and the resulting extruded products as they improve flexibility and handling as well as improving density through the reduction of pores and cracks in the polymer matrix.

Most natural plasticisers are hygroscopic and hydrophilic so can affect the resulting barrier properties of the final product by attracting additional water.

The at least one plasticiser of the present invention comprises water or at least one C—H bond (i.e. an organic compound). As such, the plasticiser of the present invention does not comprise inorganic salts and inorganic bases. Preferably the at least one plasticiser comprises at least one C—H bond (i.e. an organic compound).

In some embodiments, the at least one plasticiser comprises at least two plasticisers, such as at least three plasticisers. Suitably, the at least two plasticisers each comprise at least one C—H bond. Alternatively, the at least two plasticisers comprise a first plasticiser comprising at least one C—H bond and a second plasticiser that is water.

A hydrophobic plasticizer can be used to improve the barrier properties. Suitably, in some embodiments, the at least one plasticiser is a citrate ester such as triacetin.

Water itself is the most commonly used plasticiser with natural materials. However, water can also reduce the resulting processing or performance properties of certain materials. In the present invention, water may be a suitable plasticiser.

Suitably, the at least one plasticiser used in the present invention comprises a natural plasticizer (also known as a "bioplasticiser" i.e., derived from natural, non-fossil fuel biomass resources), such as a polyol, mono-, di- or oligosaccharides.

Suitably, a polyol may be glycerol, ethylene glycol, diethylene glycol, triethylene glycol, tetraethylene glycol and polyethylene glycol, propylene glycol, sorbitol, mannitol, erythritol, maltitol, isomalt, lactitol or xylitol.

Suitably, the at least one plasticiser comprises a fatty acid (such as oleic and linoleic acids, stearic, lauric, myristic or palmitic acids), monosaccharide (such as glucose, mannose, fructose, sucrose and dextrose), ethanolamine, triethanolamine, vegetable oil (such as coconut oils), vegetable or plant lecithin, amino acid or surfactant.

Preferably, the at least one plasticiser used in the present invention comprises a plasticiser selected from the group consisting of water, glycerol, sorbitol, xylitol, triacetine, polysorbate, mannitol, and mixtures of two or more thereof, more preferably water, glycerol or sorbitol or a mixture thereof.

Suitably, the filament, the pellet and/or the film comprises less than 40 wt % of any plasticiser, such as less than 30 wt %, 25 wt %, 20 wt %, 15 wt %, or 10 wt %.

In an embodiment, the filament, the pellet and/or the film comprises more than 1 wt % of any plasticiser, such as more than 2 wt %, 3 wt %, 4 wt %, 5 wt %, 6 wt %, 7 wt %, 8 wt %, or 8 wt %. Preferably the filament, the pellet and/or the film comprises more than 3 wt % plasticiser, more preferably more than 5 wt % plasticiser.

For the avoidance of doubt, any of the aforementioned lower range end-points may be combined with any of the aforementioned upper range end-points.

Suitably, the weight ratio between the seaweed material and the plasticiser in the filament, the pellet and/or the film is at least 2:1, such as at least 3:1 or 4:1. Suitably, the weight ratio between the seaweed material and the plasticiser in the filament, the pellet and/or the film is less than 6:1 such as less than 5:1.

In a preferred embodiment, the weight ratio between the seaweed material and the plasticiser in the filament, the pellet and/or the film is between 2:1 and 6:1, preferably between 2:1 and 4:1, such as 3:1.

The film or filament of the present invention is manufactured by "extrusion", which is a well-known manufacturing process for producing parts by forcing a molten polymer into the barrel of an extruder. The process involves feeding material into a heated single or twin-screw extruder, mixing therein and extruding a tube of the resulting molten polymer through a die to form a film or filament. Extrusion enables resultant products to be more homogeneous and uniform compared to other manufacturing techniques.

An "extruder" is a heated system of barrels and cylinders for the process of extrusion as defined above. Materials are fed into a single-screw or twin-screw barrel through feeders that may be positioned at different points along the barrel. The extruder may involve multiple kneading zones at varying temperatures to accommodate certain materials. A kneading zone comprises kneading screw elements whose main function is mixing and are used for the distribution and dispersion of the materials. At the end of the barrel is a die with the size and shape of the intended final extruded product. The invented method is not restricted to any particular extruder and may be performed using any extruder machine.

In the present invention the method may only require one extrusion step to achieve the desired homogenous and uniformed products. As such, in an embodiment, the method only comprises one extrusion step of the seaweed material and plasticiser to form a filament or film. Alternatively, the method may comprise two extrusion steps. In such instances, the filament, pellet or film obtained from the first extrusion is fed back into an extruder and extruded for a second time to obtain a film or filament or pellet.

In some embodiments, the extruder is a single screw extruder. In alternative embodiments, the extruder is a twin screw extruder. A twin screw extruder provides more shear to the formulation, so it is more effective at mixing. The skilled person will be able to choose the appropriate extruder for the desired outcome.

In some embodiments, the extruder comprises at least two material feeders, such as two or three.

The extruder may comprise at least one gravimetric powder feeder. A gravimetric powder feeder is a dosing system that allows for controlled addition of solids into the extruder at a desired speed, based on weight. In some embodiments, a composition comprising seaweed material is fed into the extruder through a gravimetric powder feeder. Alternatively, in some embodiments, a composition comprising seaweed material is fed into the extruder through a volumetric feeder.

The extruder may comprise at least one liquid feeder. A liquid feeder is a dosing system that allows for controlled volumetric or gravimetric addition of liquids into the extruder. In some embodiments, a composition comprising the at least one plasticiser is fed into the extruder through a liquid feeder, or using a gear or peristaltic pump.

In some embodiments the extruder comprises a gravimetric powder feeder positioned prior to a liquid feeder (with respect to direction of extrusion).

The temperature profile across the length of the extruder may have an influence on the properties of the extruded material, such as homogeneity.

Suitably, the temperature of the extruder at the feeder end may be about 20 to 180° C.

In some embodiments there is a zone across the length of the extruder between the feeder end and the die end, wherein the said zone has a temperature of about 20 to 180° C. Suitably high temperature assists the material to flow, and for better mixing and shear.

Suitably, the temperature of the extruder at the die end may be less than 200° C.

Suitably, the temperature of the extruder near the powder feeder may be less than 40° C.

The term "pelletisation" is a well-known industry standard and refers to the process of turning materials into the shape of a pellet. In the present invention, the filament (or extrudate) is "pelletised" to form pellets, suitably by cutting or chopping the filament into the desired length pellets.

The pelletisation step is necessary in order to obtain pellets of the homogenous material formed by the extrusion step. Pellets are small and thus easily stored and they can be easily utilised in future manufacturing steps to create products.

Continuous manufacturing increases the efficiency of the process. The extrusion of the filament may be followed by the downstream pelletisation as part of the same production line. Therefore, in some embodiments, the extrusion and pelletisation steps are a continuous, linear process. In some embodiments, the extrusion and pelletisation steps are a continuous process (e.g. the pelletisation occurs straight after the filament is extruded from the extruder). In other words, the filament (i.e. extrudate) may be pelletised immediately after being extruded, such as by die face pelletisation.

Alternatively, the process allows for a modular, flexible approach, in which the extrusion and the pelletisation steps may be separated, so that they are carried out using apparatus that is not necessarily part of the same production line, and/or extrusion and pelletisation are carried out in different locations or at a different time. Therefore, in some embodiments, the extrusion and pelletisation are separate processes.

The filament and pellets of the present invention may be of many shapes and sizes. However, in order to be suitable for pelletisation, the filament is preferably 1 to 6 mm in diameter, more preferably 2 to 4 mm.

As the pellets are formed from the filament, preferably the pellets are also 1 to 6 mm in diameter, more preferably 2 to 4 mm. This size of pellets is particularly suitable for downstream processing, particularly by injection moulding. Pellets inside this range result in better uniformity, fewer blockages and/or better ability to melt properly.

The skilled person will recognise that the method of the invention can be used industrially to produce multiple pellets quickly. These may be made in "batches", such as the machine will run for a pre-determined time, or until a certain number of pellets have been formed. The size and geometry of the pellets are driving factors for how and when a pellet will melt. It is important that the pellets are uniform in size and geometry as any variation can cause different degrees of friction which causes non-uniformity within the polymer melt. In some embodiments, substantially all (more than 90% by weight, often more than 95% by weight, for example more than 98% or 99% by weight) of the pellets produced by the method in a batch are of a size from about 1 to 6 mm, preferably 2 to 4 mm.

The films of the invention are effective at encapsulating, protecting and preserving consumer or industry products. The films are robust, resistant to splitting and leaking, while being suitably thin. Therefore, in some embodiments, the film has a thickness of 5 to 300 μm, preferably 10 to 100 μm, more preferably 30 to 100 μm, even more preferably 40 to 100 μm, yet more preferably 50 to 90 μm.

Additives may be incorporated to improve the properties of the extruded material (e.g. filament, pellet or film), such as barrier properties, tensile or flexural strength, processability, cost, sustainability, or water permeability to achieve a faster or slower breakdown in a marine environment.

Suitably, step (i) of the method of the first aspect of the invention further comprises the step of feeding one or more additives into the extruder, and extruding with the seaweed material and at least one plasticiser in step (ii).

In some embodiments, the pellet or film comprises at least 1 wt % of one or more additives, such as at least 2 wt %, 3 wt %, 4 wt %, 5 wt %, 6 wt % or 7 wt %. In some embodiments, the pellet or film comprises less than 40 wt % of one or more additives, such as less than 30 wt %, 20 wt %, 15 wt %, 10 wt %. For the avoidance of doubt, any of the aforementioned lower range end-points may be combined with any of the aforementioned upper range end-points.

In preferred embodiments, the pellet or film comprises less than 30 wt % of one or more additives, preferably less than 20 wt %, such as less than 10 wt %, such as less than 2 wt %.

Additives may be used as fillers within the seaweed matrix, to reduce the cost of the material or improve performance. Suitable such additives are insoluble fibers or powders. Insoluble fibers include cellulose, hemicellulose, and lignin based materials.

Insoluble fibers further include insoluble fibers of citrus, wheat, oat, vegetable or fruit e.g. pomegranate, pea, tomato, pineapple leaf, potato, onion, grape pomace, apple pomace, olive pomace, almond, cherry stalks, olive stone, bamboo, cellulose, bagasse, seagrass, and seaweed, preferably seaweed (such as dried and milled, added as insoluble powder).

The fibers may be milled down to a fine powder or particle size of less than 500 micron.

Additives include proteins (such as potato protein, rice protein, soy protein isolate, sunflower protein isolate, zein, pisumin, albumin, prolamin, globulin, glutenin, amandin, gluten), pectins (such as low methoxy pectin and high methoxy pectins) and natural gums (such as xanthan gum or konjac). These materials may be added as a natural source e.g. derived from waste material dried and milled into a powder or by a refined or semi-refined extract.

Filler additives can be incorporated for improved barrier properties, strength and to reduce stickiness that may occur due to the presence of excess water. Filler additives include nanocellulose or microcrystalline cellulose, clays including diatomaceous earth, bentonites, and kaolin.

Additives include hydrophobic materials such as oils or insoluble materials such as cutin, lignin, olive stone or fruit pit powders. Hydrophobic materials can improve the barrier properties of the extruded material (e.g. film or pellet used to form a moulded product).

Some plasticisers can have dual function and also act as an emulsifier such as glycerol monostearate. Such components can be advantageous to the material (e.g. film, pellet) in cases where there is a higher hydrophobic or non-water soluble component in the material. Emulsifiers may also be used as antistatic agents or to increase processability.

Additives such as antioxidants can also be used to improve the barrier properties of polysaccharide based materials as antioxidant or polyphenolic compounds such as green tea extract or vitamin E can form interactions within the polysaccharide to improve the water resistance. Lignin or other aromatic compounds can also be added to increase hydrophobicity and improve strength of the material.

Additives may also include waxes, rosins, colourants, anti-blocking agents (i.e. anti-sticking agent), or processing aids. Optionally, any hydrophobic material may be added as a secondary coating on the film or solid product e.g. wax coating.

Suitably, the of one or more additives comprises a wax or rosin, which may reduce or increase the pellet or film's disintegration in water. In some embodiments, the additive is a wax, such as carnauba, sunflower, olive and beeswax.

The material (e.g. film, pellet) may be coloured in a range of colours using additives such as natural and artificial colourants and dyes.

In some embodiments, the of one or more additives comprises a natural colourant such as chlorophyll (green), carotenoids (yellow, red, orange), flavonoids such as anthocyanins and anthoxantins (red, blue, purple).

Processing aids improve processing and lower the torque during extrusion. In some embodiments, the additive is a processing aid. In particular embodiments, the processing aid is a surfactant, such as a natural surfactant such as soy lecithin or sunflower lecithin. The surfactant may comprise calcium stearate or magnesium stearate. In particular embodiments, the processing aid is an acid, preferably citric acid.

Some processing aids may also function as an anti-blocking agent, e.g., calcium stearate or magnesium stearate. Anti-blocking agents prevent the layers of film from sticking together when in roll form. In some embodiments, the one or more additives comprise an anti-blocking agent. In particular embodiments, the anti-blocking agent comprises calcium carbonate, calcium stearate, magnesium stearate, zinc stearate, calcium silicate, magnesium silicate, magnesium sulfate, fatty acid amine, talc, silica, microfibrillated cellulose, a protein (such as a rice protein), or bamboo fibre, or mixtures thereof.

Suitably the pellet and/or filament and/or film may comprise 0-10 wt % anti-blocking agent, preferably 0.1-5 wt %, more preferably 0.1-2 wt %.

In some embodiments, the one or more additives comprises a hygroscopic salt. The addition of hygroscopic salts has been found to help keep the film or solid product 'hydrated' in the sense that they absorb moisture and so prevent the product from drying out and becoming too brittle resulting in cracking. In some embodiments, the hygroscopic salt comprises calcium chloride, magnesium chloride, magnesium sulfate, potassium acetate, potassium chloride, potassium sulphate, potassium nitrate, choline chloride, or sodium acetate, preferably calcium chloride, magnesium chloride, magnesium sulfate, potassium acetate or sodium acetate, more preferably potassium acetate.

In some embodiments, the pellet and/or filament and/or film comprise 1 to 10 wt % of hygroscopic salt, preferably 1 to 7 wt %, more preferably 2 to 5 wt % hygroscopic salt.

In some embodiments, step (i) of the method further comprises the step of feeding one or more additives into the extruder, and extruding with the seaweed material and at least one plasticiser in step (ii), wherein the at least one plasticiser comprises water. In preferred such embodiments, the method further comprises the step of moulding the pellet into a solid product, preferably moulding by injection moulding.

In some embodiments, the film comprises an acid, preferably citric acid. Films comprising citric acid have been found to be particularly suitable for blow moulding and thermoforming as they exhibit much higher flexibility when heated. As such, step (i) of the method may further comprise feeding an acid, such as citric acid, into the extruder and extruding it with the seaweed material and at least one plasticiser in step (ii). In some embodiments, the method further comprises the step of moulding the film into a moulded solid product by blow moulding or thermoforming.

As used herein, "thermoforming" refers to the process of shaping a relatively thick film material (e.g. 150 μm-2 mm) into a 3D shape such as trays, blister packs, lids among many other shapes. The film is shaped by the help of vacuum, pressure and temperature to take the shape of a mould.

The water content of the filament or film affects their tackiness (and the tackiness of the final products, e.g solid products). It is important that the water content of the filament or film is controlled to prevent the material from being too sticky for product use. The water content is controlled in the filament particularly so that the filament can be pelletised fully for further processing via injection moulding or similar. Suitably, the pellet, filament and/or film comprises less than 20 wt % water, preferably less than 15 wt %, more preferably less than 10 wt %, even more preferably less than 5 wt %, such as less than 2 wt %, such as less than 1 wt %.

In one particular embodiment, the pellet, filament and/or film comprises between 1 and 20 wt % of water, preferably between 5 and 19 wt % of water, more preferably between 8 and 18 wt % of water, most preferably between 10 and 16 wt % of water. Due to the hygroscopic nature of components of the pellet, filament and/or film, the aforementioned water contents may be obtained by virtue of the components naturally absorbing moisture and/or by the active addition of water in step (i).

Suitably, the method may further comprise the step of drying the pellet, filament or film until the pellet, filament or film comprises less than 20 wt % water, preferably less than 15 wt %, more preferably less than 10 wt %, even more preferably less than 5 wt %, such as less than 2 wt %, such as less than 1 wt %.

Suitably, the step of drying the pellet, filament and/or film is until the pellet, filament or film comprises between 1 and 20 wt % of water, preferably between 5 and 19 wt % of water, more preferably between 8 and 18 wt % of water, most preferably between 10 and 15 wt % of water.

In some embodiments, the filament may be air dried (e.g. with fans or a drying oven).

Petroleum based materials or chemical modifications to polymers are often included to improve or introduce desired properties such as enhanced barrier performance, thermal stability, biological resistance, mechanical strength, flexibility or rigidity. However, since a majority of petroleum based and/or chemically modified polymers are not naturally occurring, they are non-biodegradable in a home composting environment, and there are concerns around subsequently generated microplastics which are released and could have a detrimental impact on ecosystems. Therefore, in order to obtain home-compostable, truly biodegradable materials and retain reduced environmental damages, the method may not comprise feeding into the extruder any compositions comprising petroleum derived materials, non-naturally occurring materials and/or chemically modified polymers.

In some embodiments, the compositions fed into the extruder comprise less than 5 wt %, preferably less than 3 wt %, more preferably less than 1 wt % of petroleum based, non-naturally occurring, synthetic and/or chemically modified polymers. As such, the pellet and/or film may comprise less than 5 wt %, preferably less than 3 wt %, more preferably less than 1 wt % of petroleum based, synthetic and/or chemically modified polymers.

In some embodiments the petroleum based, synthetic, non-naturally occurring and/or chemically modified polymers are selected from the group consisting of PLA, PP, HDPE, LDPE, PVOH, PHB or PVA.

PHA and PHB may be considered as naturally occurring biodegradable plastics as they are able to be synthesised by various bacteria.

In some embodiments, the method further comprises feeding into the extruder a composition comprising PHA and/or PHB. As such, the pellet and/or film may comprise PHA and/or PHB.

In some embodiments, the compositions fed into the extruder comprise less than 10 wt %, preferably less than 5 wt %, preferably less than 3 wt %, more preferably less than 1 wt % of PHA. In some embodiments, the compositions fed into the extruder do not comprise more than 5 wt %, such not more than 3 wt % or 1 wt % of PHB. As such, the pellet and/or film may comprise less than 10 wt %, preferably less than 5 wt %, preferably less than 3 wt %, more preferably less than 1 wt % of PHA and/or PHB.

It is advantageous that films are heat sealable, as they can be used with the same machinery currently used in the plastic industry. In some embodiments, the film is heat sealable.

In some embodiments, the film is water soluble at specific temperatures or under specific conditions. In some embodiments, the film can dissolve in under 30 seconds, preferably in under 10 seconds in room-temperature aqueous liquid (e.g. water), leaving no trace in the liquid.

Calendering may be used as a method post extrusion to reduce the thickness of the flat film as it comes out of the extruder. Calendering is a process for creating high-volume, high quality plastic film and sheet. It is normally used for PVC but is also used for other thermoplastic materials. In calendering, the melted polymer is subject to heat and pressure in an extruder and formed into a sheet or film by calendering rolls. The temperature and speed of the rolls influences the properties of the film. This process can enable embossing or improvement to the film by surface treatment.

In some embodiments, the film is calendered.

The film may be produced by extruding the seaweed material and at least one plasticiser through an appropriate die, or by extruding the pellet into a film.

In some embodiments, the method further comprises the step of extruding the pellet into a film.

The pellets of the invention may be converted into solid products that may be used for a variety of purposes, such as packaging.

Injection moulding is a standard industrial method commonly used in the plastics processing industry for the mass production of products or parts with complicated shapes e.g. bowls, cutlery, food containers, garment seals, coat hangers etc. Injection moulding is used to obtain moulded products by injecting plastic materials molten by heat into a mould, followed by a cooling step to form a solid product. There are six major steps in injection moulding: clamping, injection, dwelling, cooling, mould opening and removal of products. In each stage of the injection moulding process, the operator can change the temperature or pressure tailor the process so that the material flows appropriately to ensure full filling of the mould.

An injection moulding machine comprises two main parts, an injection unit and a clamping unit. The injection unit melts the plastic by heat and then injects the molten plastic into the mould. A screw is then rotated to melt plastic introduced from the hopper and to accumulate molten plastic in front of the screw (a process called metering). After the required amount of molten plastic is accumulated, the injection process is started. As the molten plastic begins flowing into the mould, the machine controls the moving speed of the screw (called the injection speed). It also controls the dwell pressure after molten plastic fills out cavities. The position of change from speed control to pressure control is set at the point where either the screw position or injection pressure reaches a certain fixed value. Each injection moulding process is tailored to suit the material and the mould, to obtain the desired product shapes.

There are two types of blow moulding (via injection and extrusion). Injection blow moulding is used for manufacturing large volumes of hollow parts such as bottles, jars and containers. There are three stages in the process, injection, blowing and ejection. Extrusion blow moulding is a similar process except that the mould for the products is filled with the required amount of molten plastic directly from an extruder. Air is subsequently used to inflate the plastic to the required shape in the same mould. Common materials used are all petrochemical based, non natural materials, including polyethylene (high density, low density and linear low density), polypropylene, polyethylene-terephythalate (PET) and PVC.

In some embodiments, the method further comprises the step of moulding the pellet into a solid product, such as by injection moulding, or blow moulding.

In some embodiments, the solid product is cutlery, coat hangers, golf tees, clips, cable ties, or garment seals.

In some embodiments, the solid product is a packaging product, such as a tray, a film bowl, cup, bottle, lid, container, cosmetics tub, electronic housings, or secondary packaging. These packaging products may be suitable for food storage that is hot, ambient or cold (frozen). Suitably the film may be a coating, which can be applied to one of the aforementioned solid products. Suitably the method further comprises the step of applying a film coating onto a solid product. The solid product may be a seaweed product as described herein, or another type of solid product.

In some embodiments, the solid product is a packaging product used for consumer products such as food, wherein the packaging product does not degrade and prevents the consumer product from degrading.

The solid product may be thin and flexible, or thicker and rigid, so it is suitable as packaging to protect a variety of products. Suitably, the solid product has a thickness of at least 0.5 mm, such as at least 1 mm, 2 mm, or 3 mm. Suitably, the solid product has a thickness of less than 50 mm, such as less than 40 mm, 35 mm, 30 mm, 25 mm, 20 mm, 15 mm, 10 mm, 9 mm, 8 mm, 7 mm, 6 mm or 5 mm.

For the avoidance of doubt, any of the aforementioned lower range end-points may be combined with any of the aforementioned upper range end-points.

Lamination is a technique for layering a variety of functional polymer films using adhesive or bonding agents. Lamination techniques include dry and wet types, roll-to-roll continuous lamination and one-by-one sheet batch lamination.

In some embodiments, the method further comprises the step of laminating cardboard or paperboard with the film of the first aspect of the invention (including all embodiments described above) to obtain greaseproof paper, such as parchment paper.

Preferably, the film comprises an acid, such as citric acid.

In some embodiments, the method further comprises the step of laminating cardboard or paperboard with the film of the first aspect of the invention (including all embodiments described above) using an adhesive. In some embodiments, the adhesive is the film of the first aspect of the invention, such as by dissolving the film in hot water (e.g. water hotter than 50° C., such as 60, 70, 80° C. or 90° C.). As such, a biodegradable adhesive is provided.

In some embodiments, the method further comprises the step of laminating the film of the first aspect of the invention (including all embodiments described above) with a layer of other material, preferably wherein the other material has different barrier properties compared to the film. In some embodiments, the other material can be printed on.

In more particular embodiments, the other material is a metal or natural inorganic materials such as silica, titania or other inorganic oxides (such as a thin layer of metal, e.g. thinner than 0.5 mm, 0.1 mm, or 0.05 mm). This may be used to enhance the barrier properties of the film.

In more particular embodiments, the other material is a layer of coating. This may be used to enhance the barrier properties of the film.

According to a second aspect of the invention, there is provided a pellet, film or solid product obtainable by the method of the first aspect of the invention. For the avoidance of doubt, the pellet, film or solid product of the second aspect of the invention may have any of the features of the first aspect of the invention.

According to a third aspect of the invention, there is provided a pellet or film comprising at least one plasticiser, at least 30 wt % seaweed material, wherein the seaweed material comprises seaweed material derived from macro algae, and wherein the at least one plasticiser comprises water or at least one C—H bond. For the avoidance of doubt, the pellet or film of the third aspect of the invention may have any of the features of the first and second aspects of the invention.

In some embodiments of the third aspect of the invention, the pellet or film comprises less than 20 wt % water.

According to a fourth aspect of the invention, there is provided a solid product comprising at least one plasticiser, at least 30 wt % seaweed material, wherein the seaweed material comprises seaweed material derived from macro algae, and wherein the at least one plasticiser comprises water or at least one C—H bond.

In some embodiments of the fourth aspect of the invention, the solid product comprises less than 20 wt % water.

In some embodiments, the solid product is a packaging product (such as those described above) comprising at least one plasticiser, at least 30 wt % seaweed material, wherein the seaweed material comprises seaweed material derived from macro algae, and wherein the at least one plasticiser comprises water or at least one C—H bond. For the avoidance of doubt, the solid product of the fourth aspect of the invention may have any of the features of the first to third aspects of the invention.

Without wishing to be bound by theory, it is believed that the polysaccharides present in the seaweed (e.g. agar, carrageenan) form the polymeric matrix without needing to be extracted. Additionally, a plasticiser is needed so that the material obtained has good workability, processability and is homogenous. Many plasticisers are suitable, including water.

Drawing of a film or filament is necessary to create a homogeneous material and to increase tensile strength.

Pelletisation of the filament is necessary to convert the material into a pellet for subsequent processes of injection moulding or blow moulding.

A two-step process (pelletisation of a filament, then further extrusion to film formation) provides a homogeneous material with optimum flexible film quality.

EXAMPLES

Procedure for Manufacturing a Pellet or a Film

The material comprising seaweed material and plasticiser were extruded using a twin or single screw extruder with a temperature starting at around 80-120 OC ramping up to around 120° C. or 180° C. and then a reduction in temperature towards the die of the extruder with temperatures at around 80° C. or 130° C.

A pressure vent may be used prior to the die to allow the release of excess steam or moisture from the material to help prevent the bubbling of the material.

Once the material had exited the die it was then drawn into a filament or a film before being cooled using fans or a cooling oven. Once the material was cooled for a sufficient time it was then pelletised, or the material was fed directly into an in-line pelletisation set up for immediate pelletisation. The following example formulations have been made using this process.

Examples Using a Twin-Screw Extruder

Formulation Group 1: Extrusion of a Film Using a Flat Die

| Ingredient | Example 1 (% by mass) | Example 2 (% by mass) | Example 3 (% by mass) |
|---|---|---|---|
| Seaweed | 60 | 60 | 55 |
| Starch | 10 | 14 | 15 |
| Plasticiser mixture (glycerol and sorbitol) | 30 | 25 | 28 |
| Additive (calcium or magnesium stearate) | — | 1 | 1 |
| Additive (citric acid) | — | — | 1 |

Processing aids can be added within the range of 0.1%-5%

Formulation Group 2: Extrusion of a Filament Using a Round Die

| Ingredient | Example 1 (% by mass) |
|---|---|
| Seaweed fibres <250 um | 65 |
| Water | 13 |
| Glycerol | 22 |

Formulation Group 3: Extrusion of a Film

| Ingredient | Example 1 (% by mass) |
|---|---|
| Seaweed | 80 |
| Plasticiser mixture (glycerol and sorbitol) | 10 |
| Water | 10 |

Formulation Group 4: Extrusion of a Film

| Ingredient | Example 1 (% by mass) |
|---|---|
| Agar (extract or agar containing seaweed) | 85 |
| Starch | 5 |
| Plasticiser mixture (glycerol and triacetin) | 9 |
| Calcium carbonate | 1 |

Formulation Group 5: Extrusion of a Film

| Ingredient | Example 1 (% by mass) | Example 2 (% by mass) |
|---|---|---|
| Red seaweed (agar or whole seaweed) | 40 | 60 |
| Cellulose/lignin containing fiber/powder (citrus*) | 30 | 15* |
| Plasticiser (sorbitol) | 30 | 24.95 |
| Calcium stearate | — | 0.05 |

Formulation Group 6: Extrusion of a Filament, Pelletised and Injection Moulded.

| Ingredient | Example 1 (% by mass) | Example 2 (% by mass) | Example 3 (% by mass) |
|---|---|---|---|
| Seaweed | 57 | 54 | 56 |
| Starch | 10 | 14 | 18 |
| Plasticiser mixture (glycerol and sorbitol) | 20 | 16 | 2 |
| Additive (calcium or magnesium stearate) | 2 | 1 | 2 |
| Additive (citric acid) | 1 | 1 | 2 |
| Additive (Potassium acetate) | 10 | 4 | 8 |
| Water | | 10 | 14 |

Example 3 was particular useful for injection moulding solid products due to its rigid properties.

Examples Using a Single-Screw Extruder

Formulation Group 7: Compounding of Seaweed Pellets for Subsequent Injection Moulding or Extrusion into a Film

| Ingredient | Example 1 (% by mass) |
|---|---|
| Red seaweed (agar, carrageenan or whole seaweed) | 70 |
| Glycerol | 20 |
| Water | 10 |

Using a single-screw extruder, red seaweed was blended with water then dried in an oven. The seaweed was then milled and sieved to a particle size <800 microns.

The seaweed and liquid components are pre-mixed into a slurry and fed directly into the extrusion feeder for the creation of a single filament. The filament was then optionally further dried to remove moisture content and pelletised or recompounded for improved properties.

Formulation Group 8: Compounding of Seaweed Pellets for Subsequent Injection Moulding or Compression Moulding

| Ingredient | Example 1 (% by mass) | Example 2 (% by mass) | Example 3 (% by mass) | Example 4 (% by mass) |
|---|---|---|---|---|
| Seaweed | 70 (insoluble fibers) | 50 (Agar containing red seaweed-Gracilaria or Gelidium) | 51 (red) | 55 (agar) 12 (seaweed extract) |
| Starch | — | 20 | 18 | — |
| Plasticiser | 20 (sorbitol) 10 (water) | 19 (glycerol and mannitol) | 28 (glycerol and water) | 22 (glycerol and sorbitol) |
| Lignin | | 10 | — | 9 |
| Additives | — | 1 (stearates and carbonates) | 1 (Mg stearate) | 2 (stearates and carbonates) |

Using a single-screw extruder, the fibers and liquid components are pre-mixed into a slurry and fed directly into the extrusion feeder for the creation of a single filament. Filament was then optionally further dried to remove moisture content and pelletised or recompounded for improved properties.

Thermoforming

Thick films (150 microns-2 millimeters) obtained via extrusion were thermoformed into various shapes including but not limited to lids, trays and containers with various dimensions and details such as the text on the articles. Thermoforming of the thick films was achieved upon the application of vacuum and heat to the films by using a mould of the desired shape so that the film could conform to the shape of the mould at the end of the thermoforming process.

| Ingredient | Example 1 (% by mass) | Example 2 (% by mass) | Example 3 (% by mass) |
|---|---|---|---|
| Seaweed | 60 | 72 | 57 |
| Starch | 15 | 0 | 20 |
| Plasticiser mixture (glycerol and sorbitol)* | *24 | *25 | 20 |
| Additive (calcium or magnesium stearate) | 1 | 1 | 2 |
| Additive (citric acid) | — | 2 | 1 |

Blown Film Extrusion

Pellets obtained from powders via twin screw extrusion were processed in a blown film extrusion line consisting of a single screw extruder fitted with a blown film die and an air ring in which the continuous material coming out of the die was inflated with air to obtain a film with a desired thickness value suitable for packaging film applications. The blown film obtained this way was then collected on to rolls.

| Ingredient | Example 1 (% by mass) | Example 2 (% by mass) | Example 3 (% by mass) |
|---|---|---|---|
| Seaweed | 60 | 80 | 60 |
| Starch | 15 | 0 | 10 |
| Plasticiser mixture (glycerol and sorbitol)* | *24 | *18 | 25 |
| Additive (calcium or magnesium stearate) | 1 | 1 | 2 |
| Additive (citric acid) | — | 1 | 3 |

Material Properties

The pellets of the Example formulations above have been further extruded into a film and have been moulded into solid products by injection moulding and blow moulding.

The films were tested in (i) tensile testing including elastic modulus, as per ASTM D882, to ensure the material yield point is suitable for a packaging material (ii) tensile strength as per ASTM D882 to a value suitable to allow processing through industrial machinery, (iii) water vapour transmission rate, as per ASTM E96, to verify that the film is suitable as a barrier layer for packaging applications and (iv) moisture absorption. Good results were obtained in tests (i) to (iv).

The solid products were tested in (i) tensile testing, (ii) moisture absorption, and (iii) seal strength testing with good results that ensure the film is suitable for use in packaging applications.

CONCLUSION

Pellets comprising at least 30 wt % seaweed material were obtained by extrusion and pelletising. The pellets of the Example formulations above have been further moulded into solid products by injection moulding. Products made are a tray, ruler, cutlery, jar, and a bowl. The pellets of the example formulations above can also be extruded into films which can then be thermoformed into trays or lids, or blow moulded to form large film sheets. Film and solid products have suitable properties (strength, durability, water barrier) for being used, for instance, as packaging materials.

The invention claimed is:

1. A method of manufacturing a pellet or film, the method comprising:

- feeding seaweed material and at least two or more plasticisers into an extruder, and extruding in one step the seaweed material and the at least two or more plasticisers through a die to obtain a filament or the film, wherein the filament is pelletised to form the pellet;
- wherein the seaweed material comprises seaweed material derived from macro algae;
- wherein one of the at least two or more plasticisers is water, and another one of the at least two or more plasticisers is selected from the group consisting of triacetin, a polyol, a fatty acid, monosaccharides, disaccharides, oligosaccharides, ethanolamine, triethanolamine, vegetable oil, vegetable lecithin, plant lecithin, an amino acid, a surfactant and mixtures thereof; and
- wherein the filament, the pellet or the film comprises at least 50 wt % of the seaweed material, more than 5 wt % of the at least two or more plasticisers, and less than 20 wt % of the water.

2. The method of claim 1, wherein the method further comprises drying the film, the pellet, and/or the filament.

3. The method of claim 1, wherein the filament, the pellet and/or the film comprises less than 30 wt % of the at least two or more plasticisers.

4. The method of claim 1, wherein the at least two or more plasticisers are a mixture of the water and glycerol.

5. The method of claim 1, wherein the at least two or more plasticisers comprise glycerol and sorbitol.

6. The method of claim 1, wherein the method further comprises feeding a polysaccharide into the extruder, wherein the polysaccharide is starch.

7. The method of claim 6, wherein the starch is at least 5 wt % with respect to a total weight of the filament, the pellet, or the film.

8. The method of claim 1, wherein the filament or pellet is 2 to 4 mm in diameter.

9. The method of claim 1, wherein the seaweed material comprises one or a mixture of two or more of agar, carrageenan and alginate.

10. The method of claim 1, wherein the seaweed material and the at least two or more plasticisers fed into the extruder comprise less than 5 wt % of synthetic polymers PLA, PP, HDPE, LDPE, PVOH, PHB or PVA.

11. The method of claim 1, wherein a weight ratio between the seaweed material and the at least two or more plasticisers in the filament, the pellet and/or the film is less than 6:1.

12. The method of claim 1, wherein the film has a thickness of 30 to 100 μm.

13. The method of claim 1, wherein the pellet or the filament or the film further comprises an additive selected from the group consisting of wax, insoluble fibers, potato protein, soy protein isolate, sunflower protein isolate, zein, pisumin, albumin, prolamin, globulin, glutenin, amandin, gluten, and natural gums.

14. The method of claim 1, wherein the method further comprises feeding into the extruder a composition comprising citric acid and a composition comprising agar.

15. The method of claim 10, wherein the seaweed material and the at least two more plasticisers fed into the extruder comprise less than 1 wt % of the synthetic polymers PLA, PP, HDPE, LDPE, PVOH, PHB, PVA.

16. The method of claim 1, wherein the polyol is selected from the group consisting of glycerol, ethylene glycol, diethylene glycol, triethylene glycol, tetraethylene glycol, polyethylene glycol, propylene glycol, sorbitol, mannitol, erythritol, maltitol, isomalt, lactitol and xylitol.

17. The method of claim 1, wherein the fatty acid is selected from the group consisting of oleic acid, linoleic acid, stearic acid, lauric acid, myristic acid, palmitic acid and combinations thereof.

18. The method of claim 1, wherein one of the at least two or more plasticisers is a monosaccharide.

19. The method of claim 18, wherein the monosaccharide is glucose, mannose, fructose, sucrose or dextrose.

* * * * *